United States Patent
Liang et al.

(10) Patent No.: US 9,948,647 B2
(45) Date of Patent: Apr. 17, 2018

(54) METHOD AND DEVICE FOR AUTHENTICATING STATIC USER TERMINAL

(71) Applicant: ZTE Corporation, Shenzhen (CN)

(72) Inventors: Qiandeng Liang, Shenzhen (CN); Lei Shi, Shenzhen (CN); Na Song, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 127 days.

(21) Appl. No.: 14/764,732

(22) PCT Filed: Sep. 17, 2013

(86) PCT No.: PCT/CN2013/083682
§ 371 (c)(1),
(2) Date: Jul. 30, 2015

(87) PCT Pub. No.: WO2014/117525
PCT Pub. Date: Aug. 7, 2014

(65) Prior Publication Data
US 2015/0365414 A1 Dec. 17, 2015

(30) Foreign Application Priority Data

Feb. 4, 2013 (CN) .......................... 2013 1 0043784

(51) Int. Cl.
*H04W 12/06* (2009.01)
*H04L 29/06* (2006.01)
*H04L 29/12* (2006.01)

(52) U.S. Cl.
CPC ........ *H04L 63/0892* (2013.01); *H04L 61/103* (2013.01); *H04W 12/06* (2013.01)

(58) Field of Classification Search
CPC ... H04L 63/0892; H04L 61/103; H04W 12/06
(Continued)

(56) References Cited

U.S. PATENT DOCUMENTS 7,152,160 B2 * 12/2006 Lantto ................ H04L 12/1425
713/168
7,580,701 B2 * 8/2009 Ross ..................... H04L 63/104
455/410

(Continued)

FOREIGN PATENT DOCUMENTS

| CN | 101472257 A | 7/2009 |
| CN | 101888630 A | 11/2010 |
| CN | 102625306 A | 8/2012 |

OTHER PUBLICATIONS

International Search Report for corresponding application PCT/CN2013/083682 filed Sep. 17, 2013; dated Dec. 19, 2013.

*Primary Examiner* — Abu Sholeman
(74) *Attorney, Agent, or Firm* — Cantor Colburn LLP (57) ABSTRACT

Provided are a method and device for authenticating a static user terminal. The method comprises: an identity request message used for acquiring a user identity of the static user terminal is sent to the static user terminal; a response message is received from the static user terminal, wherein the response message carries the user identity of the static user terminal; and, an Extensible Authentication Protocol (EAP) authentication is performed on the static user terminal according to the user identity of the static user terminal. The present disclosure solves the problem in the related art of low security in the authentication on the static user terminal access the network, thus achieving the effects of increasing the security and reliability in the authentication on the static user terminal accessing the network and improving the WLAN service using experience of the static user.

8 Claims, 7 Drawing Sheets

(58) Field of Classification Search
USPC .......................................................... 726/7
See application file for complete search history.

(56) References Cited

U.S. PATENT DOCUMENTS

| | | | | |
|---|---|---|---|---|
| 8,588,741 B1* | 11/2013 | Khalil | ................... | H04W 12/06 455/410 |
| 2003/0051041 A1* | 3/2003 | Kalavade | ............... | G06Q 20/14 709/229 |
| 2003/0219129 A1* | 11/2003 | Whelan | ................. | H04L 9/0891 380/270 |
| 2004/0158716 A1* | 8/2004 | Turtiainen | ............... | H04L 63/06 713/172 |
| 2005/0025125 A1* | 2/2005 | Kwan | ..................... | H04L 63/10 370/352 |
| 2005/0078824 A1* | 4/2005 | Malinen | .................. | H04L 63/08 380/247 |
| 2006/0161778 A1* | 7/2006 | Stirbu | ................ | H04N 21/4126 713/176 |
| 2006/0179310 A1* | 8/2006 | Zhang | .................... | H04L 63/08 713/168 |
| 2007/0019580 A1* | 1/2007 | Zhang | .................... | H04W 48/18 370/315 |
| 2008/0043686 A1* | 2/2008 | Sperti | ..................... | G06F 21/55 370/338 |
| 2008/0196090 A1 | 8/2008 | Baron | | |
| 2012/0131329 A1* | 5/2012 | Liang | .................. | H04L 12/4625 713/151 |
| 2013/0036190 A1* | 2/2013 | Serge | .................. | H04L 65/1073 709/217 |
| 2014/0223538 A1* | 8/2014 | Van De Velde | .... | H04L 12/2867 726/12 |
| 2015/0195773 A1* | 7/2015 | Weng | ........................ | G01S 5/02 370/328 |
| 2015/0327073 A1* | 11/2015 | Rommer | ............. | H04L 63/0876 455/410 |
| 2015/0382397 A1* | 12/2015 | Liang | .................. | H04W 76/028 370/216 |
| 2016/0365983 A1* | 12/2016 | Shahabuddin | ........ | H04L 9/3249 |

* cited by examiner

METHOD AND DEVICE FOR AUTHENTICATING STATIC USER TERMINAL

TECHNICAL FIELD

The present disclosure relates to the field of communications, including e.g., a method and device for authenticating a static user terminal.

BACKGROUND

With the expansion and refinement of network services, all kinds of applications emerge one after another. Before a user terminal accesses a network, some network parameters necessary to the network must be obtained. Some users obtain network configuration parameters such as an Internet Protocol (IP) address, a Domain Name Service (DNS) and a gateway through a Dynamic Host Configuration Protocol (DHCP), and some user terminals manually set the network configuration parameters such as the IP address, the DNS and the gateway to access the network. The user terminals that manually set the IP are also called static users.

Currently, when a static user is deployed on a Broadband Network Gateway (BNG), an authentication method generally used is to authenticate by binding user Virtual Local Area Network (VLAN) information or binding user Media Access Control (MAC). Since there is no secure authentication protocol interaction, circuit information of a legal static user is easy to be simulated (simulating the same VLAN, the same MAC, and the like) by an illegal user to trigger online to affect the service use of the legal user and damage the benefits of the legal user; therefore, such an authentication manner is often poor in security, furthermore, wireless accesses such as Wireless Fidelity (Wi-Fi) is increasingly popular today, and the static user has a growing requirement on the reliability and convenience of the access mode, for example, the access manners for the backup of Wireless Local Area Network (WLAN) access and fixed-line, such as optical fibre, is required to enhance the reliability of the network. Furthermore, the WLAN access manner may better simplify the access way to reduce the access cost and bring a removable good experience to the user. A traditional static user access manner is a circuit authentication manner, which requires to check and define the access circuit of the static user, tedious configurations such as the MAC address, IP address and access circuit, user account and key of the static user have to be configured on BNG equipment, thus increasing the complexity of maintenance and not supporting an extended authentication method with high security requirement and a two level security tunnel of the user, also limiting the mobility of the user in a WLAN scenario (such as drifting and roaming on different circuits managed by the BNG), furthermore, when it is applied in a WLAN network, the problem of the air interface data security is difficulty to be solved.

Therefore, there are problems of low security and poor mobility in authentication on the static user accessing the network in the related art.

SUMMARY

The present disclosure provides a method and device for authenticating on a static user terminal to at least solve the problems of low security and poor mobility in authentication on the static user accessing the network in the related art.

According to one aspect of the present disclosure, a method for authenticating a static user terminal, comprising: sending to the static user terminal an identity request message used for acquiring a user identity of the static user terminal; receiving a response message from the static user terminal, wherein the response message carries the user identity of the static user terminal; performing an Extensible Authentication Protocol, EAP, authentication on the static user terminal according to the user identity of the static user terminal.

In an example embodiment, after the EAP authentication is performed on the static user terminal according to the user identity of the static user terminal, and in a case where the EAP authentication is performed successfully, the method further comprises:

transmitting to an access key agreement point a pair-wise master key carried in authorization information, wherein the access key agreement point negotiates, with a 802.1X client side of the static user terminal, a key used for air interface data message interaction.

In an example embodiment, performing, according to the user identity of the static user terminal, the EAP authentication on the static user terminal accessing a network based on an Extensible Authentication Protocol over Local Area Network, EAPoL, comprises: transmitting an access request message to an Authentication, Authorization and Accounting, AAA, server, wherein the access request message carries the user identity of the static user terminal, which requests to access the network based on the EAPoL; receiving an authentication result from the AAA server, wherein the AAA server performs, according to the user identity of the static user terminal, a negotiation and an authentication on the static user terminal accessing the network based on the EAPoL.

In an example embodiment, the identity request message used for acquiring the user identity of the static user terminal is triggered to be sent to the static user terminal by at least one of the following triggering manners: triggering the EAP authentication on the static user terminal in a manner of capturing an uplink traffic of an unauthorized static user terminal, wherein the uplink traffic is discovered by matching with a pre-stored static user information table; triggering the EAP authentication on the static user terminal in a manner of capturing a downlink traffic of an unauthorized static user terminal, wherein the downlink traffic is discovered by matching with a pre-stored static user information table;

triggering the EAP authentication on the static user terminal in a manner of capturing an Address Resolution Protocol, ARP, message of an unauthorized static user terminal, wherein the ARP message is discovered by matching with a pre-stored static user information table; triggering the EAP authentication on the static user terminal in a manner of capturing an Internet Control Message Protocol Version 6 Neighbour Solicitation, ICMPv6 NS, protocol message of an unauthorized static user terminal, wherein the ICMPv6 NS protocol message is discovered by matching with a pre-stored static user information table; triggering the EAP authentication on the static user terminal in a manner of capturing an ARP message of an unauthorized static user terminal, wherein the ARP message is discovered by matching with a pre-stored static user information table;

receiving an EAPoL-start message which is sent by the static user terminal and used for triggering the EAP authentication.

In an example embodiment, before or after the EAP authentication is performed on the static user terminal according to the user identity of the static user terminal, the method further comprises: acquiring identity safety information of the static user terminal by at least one of the following triggering manners: acquiring the identity safety information of the static user terminal in a manner of expanding a configuration option of an EAPoL-Start Announcement configuration; after the EAP authentication is performed successfully, acquiring the identity safety information in a manner of receiving an EAPoL announcement message which is sent by the static user terminal; acquiring the identity safety information by parsing from a matched uplink message in a case where the EAP authentication is triggered by an uplink traffic of the static user terminal; acquiring the identity safety information by the interaction of an ARP message and/or an NS message.

According to another aspect of the embodiment, a device for authenticating a static user terminal, comprising: a sending component, configured to send to the static user terminal an identity request message used for acquiring a user identity of the static user terminal; a receiving component, configured to receive a response message from the static user terminal, wherein the response message carries the user identity of the static user terminal; an authenticating component, configured to perform an Extensible Authentication Protocol, EAP, authentication on the static user terminal according to the user identity of the static user terminal.

In an example embodiment, the device further comprises: a transmitting component, configured to, after the EAP authentication is performed on the static user terminal according to the user identity of the static user terminal and in a case where the EAP authentication is performed successfully, transmit to an access key agreement point a pair-wise master key carried in authorization information, wherein the access key agreement point negotiates, with a 802.1X client side of the static user terminal, a key used for air interface data message interaction.

In an example embodiment, the authenticating component comprises: a transmitting element, configured to transmit an access request message to an Authentication, Authorization and Accounting, AAA, server, wherein the access request message carries the user identity of the static user terminal, which requests to access a network based on an Extensible Authentication Protocol over Local Area Network, EAPoL; a receiving element, configured to receive an authentication result from the AAA server, wherein the AAA server performs, according to the user identity of the static user terminal, a negotiation and an authentication on the static user terminal accessing the network based on the EAPoL.

In an example embodiment, the device further comprises a triggering component, configured to trigger the identity request message used for acquiring the user identity of the static user terminal to be sent to the static user terminal by at least one of the following triggering manners: triggering the EAP authentication on the static user terminal in a manner of capturing an uplink traffic of an unauthorized static user terminal, wherein the uplink traffic is discovered by matching with a pre-stored static user information table; triggering the EAP authentication on the static user terminal in a manner of capturing a downlink traffic of an unauthorized static user terminal, wherein the downlink traffic is discovered by matching with a pre-stored static user information table; triggering the EAP authentication on the static user terminal in a manner of capturing an Address Resolution Protocol, ARP, message of an unauthorized static user terminal, wherein the ARP message is discovered by matching with a pre-stored static user information table; triggering the EAP authentication on the static user terminal in a manner of capturing an Internet Control Message Protocol Version 6 Neighbour Solicitation, ICMPv6 NS, protocol message of an unauthorized static user terminal, wherein the ICMPv6 NS protocol message is discovered by matching with a pre-stored static user information table; triggering the EAP authentication on the static user terminal in a manner of capturing an ARP message of an unauthorized static user terminal, wherein the ARP message is discovered by matching with a pre-stored static user information table;

receiving an EAPoL-start message which is sent by the static user terminal and used for triggering the EAP authentication.

In an example embodiment, the device further comprises an acquiring component, configured to, before or after the EAP authentication is performed on the static user terminal according to the user identity of the static user terminal, acquire identity safety information of the static user terminal by at least one of the following triggering manners: acquiring the identity safety information of the static user terminal in a manner of expanding a configuration option of an EAPoL-Start Announcement configuration; after the EAP authentication is performed successfully, acquiring the identity safety information in a manner of receiving an EAPoL announcement message which is sent by the static user terminal; acquiring the identity safety information by parsing from a matched uplink message in a case where the EAP authentication is triggered by an uplink traffic of the static user terminal; acquiring the identity safety information by the interaction of an ARP message and/or an NS message.

By way of the present disclosure, an identity request message used for acquiring a user identity of the static user terminal is sent to the static user terminal; a response message is received from the static user terminal, wherein the response message carries the user identity of the static user terminal; and an EAP authentication is performed on the static user terminal according to the user identity of the static user terminal. The present disclosure solves the problem in the related art of low security and poor mobility in the authentication on the static user accessing, thus achieving the effects of increasing the security and reliability in authentication on the static user accessing and improving the WLAN service use experience of a static user.

DESCRIPTION OF THE ACCOMPANYING DRAWINGS

Drawings, provided for further understanding of the present disclosure and forming a part of the specification, are used to explain the present disclosure together with embodiments of the present disclosure rather than to limit the present disclosure. In the drawings.

DETAILED DESCRIPTION OF THE EMBODIMENTS

The present disclosure is described below with reference to the accompanying drawings and embodiments in detail. Note that, the embodiments of the present disclosure and the features of the embodiments can be combined with each other if there is no conflict.

Figure 1:
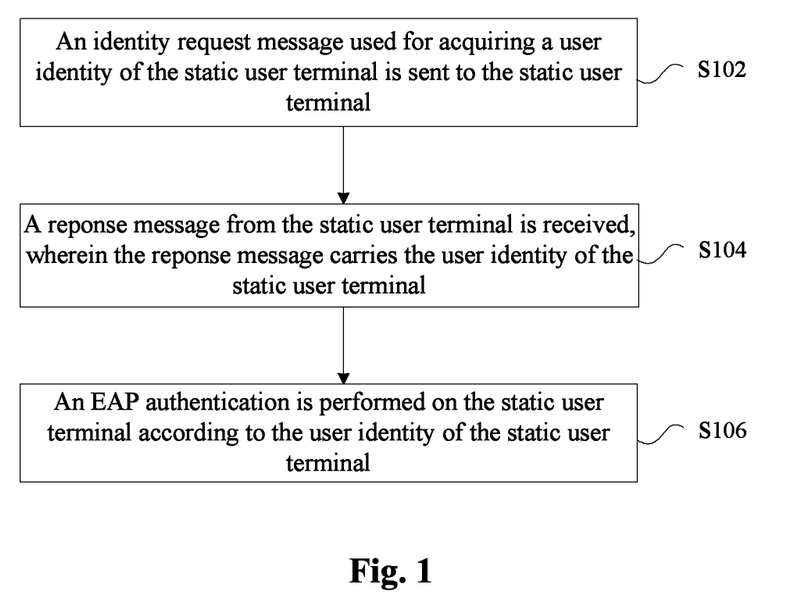
FIG. 1 is a flowchart of a method for authenticating on a static user terminal according to an embodiment of the present disclosure.

In the present embodiment, a method for authenticating on a static user terminal is provided, and the static user terminal being a static IP user terminal is described as an example in the present embodiment, FIG. 1 is a flowchart of a method for authenticating a static user terminal according to an embodiment of the present disclosure, as shown in FIG. 1, the flowchart comprises the following steps:

step S102, an identity request message used for acquiring a user identity of the static user terminal is sent to the static user terminal, wherein the static user terminal which requests to access based on the EAPoL, i.e., 802.1X;

step S104, a response message is received from the static user terminal, wherein the response message carries the user identity of the static user terminal;

step S106, an EAP authentication is performed on the static user terminal according to the user identity of the static user terminal.

By means of the steps, the EAPoL is used to perform authentication on the static user terminal accessing a network, with respect to the fact in the related art that there is no secure authentication protocol interaction to perform authentication, the problems of low security and poor mobility in the authentication on the static user accessing in the related art, which are brought by the fact that there is no secure authentication protocol in the related art, are effectively avoided, by way of using a secure and rigorous authentication protocol to perform authentication on the static user terminal accessing the network, the security and the reliability of the static user terminal accessing the network are improved, and the user experience of a user using WLAN is improved.

After the authentication is performed on the user terminal accessing the network based on EAPoL, in order to enable the data message of the interaction between the static user terminal and the network to be safe and reliable, a pair-wise master key carried in authorization information is transmitted to an access key agreement point after the EAP authentication is performed, according to the user identity of the static user terminal, on the static user terminal accessing the network based on the EAPoL and in the case where the EAP authentication is performed successfully, wherein the access key agreement point negotiates, with a 802.1X client side of the static user terminal, a key used for air interface data message interaction. In an air interface encryption scenario of a WLAN access, the gateway needs to transmit the pair-wise master key carried in the authorization information allocated by an authentication server to an access key negotiation point (such as AP) in a WLAN access network for aiming at a static IP user terminal, wherein the pair-wise master key is used for the access key negotiation point to perform key negotiation with a 802.1X (i.e., EAPoL) client side of the static IP user terminal, and the result obtained by key negotiation is used for encryption and decryption of an air interface message. The negotiated key is used for the date message interaction between the static user terminal and the network. Since the key is formed based on the EAPoL negotiation, the data message interaction performed by using the key is more safe and reliable.

Various processing manners can be used to perform, according to the user identity of the static user terminal, EAP authentication on the static user terminal accessing the network based on the EAPoL. For example, the following optional processing manner can be used: firstly, an access request message is transmitted to an AAA server, wherein the access request message carries the user identity of the static user terminal, which requests to access the network based on the EAPoL; the AAA server receives the access request message, and determines the static user terminal according to the user identity of the static user terminal carried in the access request message, and negotiates, with the determined static user terminal, an authentication method of the EAP authentication, and then performs authentication interaction according to the negotiated authentication method to perform authentication on the static user terminal accessing the network based on the EAPoL, and returns an authentication result. When the authentication result is received from the AAA server, the authentication performed on the static user terminal accessing the network based on the EAPoL is completed. In the optional processing manner, after the gateway equipment receives an authentication response message which contains the user identity of the static user terminal and is replied by the user terminal, and the authentication response message is sent to an authentication server according to a local policy and serves as a relay EAP authentication to communicate between the user and the authentication server.

The network parameter configuration performed on the static user terminal accessing the network is completed at a user side, and after the static user information or a static user information list configured for the static user is also performed at the user side, the authentication performed on the static user can be triggered by various triggering manners, i.e., the identity request message for acquiring the user identity of the static user terminal is triggered to be sent to the static user terminal. In an example embodiment, when the triggering operation is performed by the network device, the triggering operation can be performed by at least one of the following triggering manners: user messages such as an uplink traffic or downlink traffic of an unauthorized static IP user or ARP request/ICMPv6 NS are captured on the gateway equipment according to the configuration to trigger the EAP authentication of the static IP user. For example, when the static user terminal accesses (near) Customer Premise Equipment (CPE) in an associated way, an EAPoL-start message which is sent by the static user equipment and requires to use the 802.1X method to access the network is received, the authentication performed on the static user is triggered; for another example, when the uplink traffic or the downlink traffic of the unauthorized static user terminal is discovered by matching with a pre-stored static user information table (network side); it is learned that the static user terminal requires to use the 802.1X method to access the network, and the authentication performed on the static user is triggered; for still another example, after the gateway equipment captures the forwarding traffic of the unauthorized static IP user, the authentication request package for acquiring the user identity of the static user terminal is sent to the user terminal on the initiative. Of course, the triggering operation also can be performed by a static IP user, for example, an unauthorized static IP user uses a 802.1X client side to directly send an EAPoL-start message for triggering the EAP authentication to the gateway equipment, after the gateway receives the EAPoL-start message, an authentication request package for acquiring the user identity of the static user terminal is sent to the static IP user terminal to trigger the authentication on the static user terminal. Of course, there are also other triggering manners, which will not be enumerated herein.

In an optional example, in order to access a network in time after the EAP authentication is performed, or in order to improve the speed of accessing a network, before or after the EAP authentication is performed according to the user identity of the static user terminal on the static user terminal, the identity safe information (i.e., access network parameters) of the static user terminal can be learned in time, and the identity safe information (such as, the gateway examining the IP and MAC binding relationship of the user) is checked, or a secure tunnel (such as MACSec defined by 802.1X protocol) is created between the user and the gateway. Of course, there are various acquiring manners, for example, the identity safe information of the static user terminal can be acquired by at least one of the following manners: acquiring the identity safety information of the static user terminal in a manner of expanding a configuration option of an EAPoL-Start Announcement configuration; and after the EAP authentication is performed successfully, acquiring the identity safety information in a manner of receiving an EAPoL announcement message which is sent by the static user terminal, that is, the 802.1X client side of the static IP user terminal actively expend options of an EAPoL-Start-Announcement or EAPoL-Announcement message and reports IP address information of the static IP user terminal on the initiative. After the gateway receives the message, the MAC and the IP of the user terminal is resolved and obtained, then it is checked that whether the MAC and the IP are matched with the binding relationship configured on the gateway, in the case where the authentication is triggered by the uplink traffic of the static user terminal, the identity safe information of the static user terminal is resolved and obtained from the matched uplink message; the identity safe information of the static user terminal is obtained by the interaction of an ARP message or a NS message. For example, the MAC and the IP of the static user terminal are acquired by an ARP request and/or an NS message of the static IP user to check whether the MAC and the IP conform to the binding relationship configured on the gateway; when the gateway equipment does not receive the ARP request or the NS message of the static IP user, the ARP request or the NS message can be initiated on the initiative, the MAC and the IP of the static user terminal are obtained by an ARP response message or the NA message replied by the static IP user terminal, and it is checked whether the MAC and the IP conform to the binding relationship configured on the gateway.

A device for authenticating a static user terminal is also provided in this embodiment, the device is used for realizing the examples and preferred embodiments, the device is optionally applied to the gateway equipment (such as on a Broadband Network Gateway (BNG)), of course, the device also can be applied to other network cell equipment which perform the authentication on the static user terminal, and what has been described is not repeated. As used hereinafter, the term "module" may realize hardware and/or software combination with a predetermined function. Although the apparatus described in the following embodiment is preferably implemented by software, but the hardware, or a combination of software and hardware also possibly be conceived.

Figure 2:
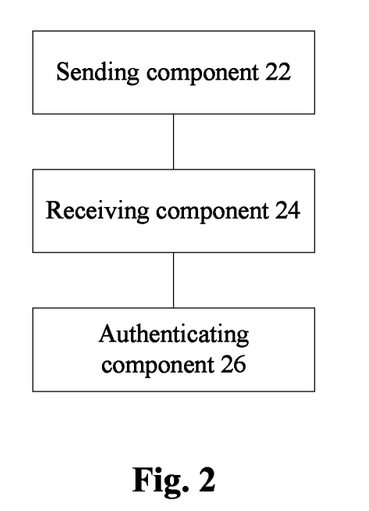
FIG. 2 is a structural block diagram of a device for authenticating a static user terminal according to an embodiment of the present disclosure.

FIG. 2 is a structural block diagram of a device for authenticating a static user terminal according to an embodiment of the present disclosure, as shown in FIG. 2, the device comprises a sending component 22, a receiving component 24 and an authenticating component 26, and the device is described below.

The sending component 22 is configured to send to the static user terminal an identity request message used for acquiring a user identity of the static user terminal; the receiving component 24 is configured to receive a response message from the static user terminal, wherein the response message carries the user identity of the static user terminal; and the authenticating component 26 is configured to perform an EAP authentication on the static user terminal according to the user identity of the static user terminal.

Figure 3:
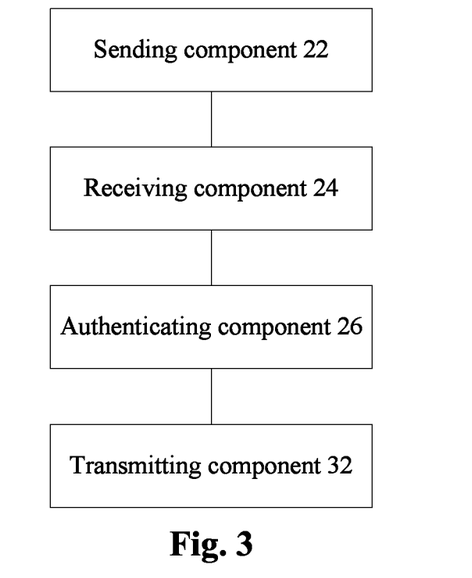
FIG. 3 is an example structural block diagram I of the device for authenticating the static user terminal according to an embodiment of the present disclosure.

FIG. 3 is an example structural block diagram I of the device for authenticating the static user terminal according to an embodiment of the present disclosure, as shown in FIG. 3, the device further comprises a negotiating component 32 besides comprising all the modules in FIG. 2, the negotiating component 32 is described below.

The negotiating component 32 is connected to the authenticating component 26, and is configured to, after the EAP authentication is performed on the static user terminal according to the user identity of the static user terminal and in the case where the EAP authentication is performed successfully, transmit to an access key agreement point a pair-wise master key carried in authorization information, wherein the access key agreement point negotiates, with a 802.1X client side of the static user terminal, a key used for air interface data message interaction.

Figure 4:
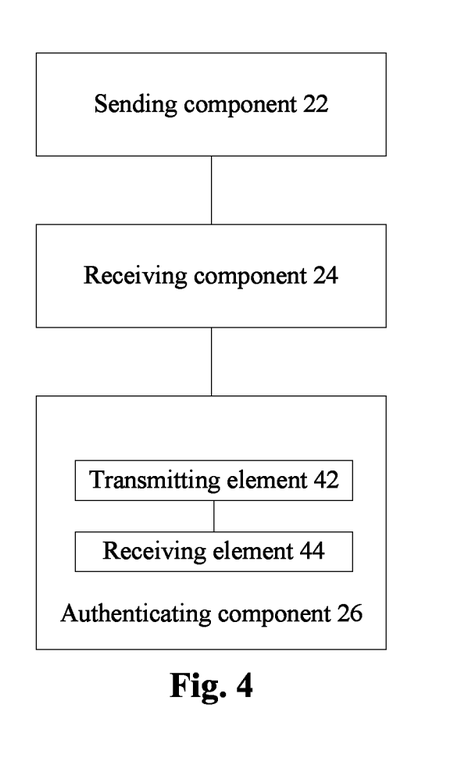
FIG. 4 is an example structural block diagram of an authenticating component 26 in the device for authenticating the static user terminal according to an embodiment of the present disclosure.

FIG. 4 is an example structural block diagram of an authenticating component 26 in the device for authenticating the static user terminal according to an embodiment of the present disclosure, as shown in FIG. 4, the authenticating component 26 comprises a transmitting element 42 and receiving element 44, the authenticating component 26 is described below.

The transmitting element 42 is configured to transmit an access request message to an AAA server, wherein the access request message carries the user identity of the static user terminal, which requests to access a network based on the EAPoL; and the receiving element 44 is connected to the transmitting element 42 and is configured to receive an authentication result from the AAA server, wherein the AAA server performs, according to the user identity of the static user terminal, a negotiation and an authentication on the static user terminal accessing the network based on the EAPoL.

Figure 5:
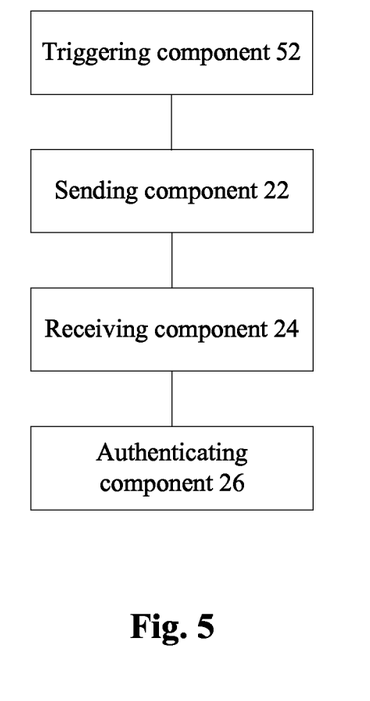
FIG. 5 is an example structural block diagram II of the device for authenticating the static user terminal according to an embodiment of the present disclosure.

FIG. 5 is an example structural block diagram II of the device for authenticating the static user terminal according to an embodiment of the present disclosure, as shown in FIG. 5, the device further comprises a triggering component 52 besides comprising all the modules in FIG. 2, the triggering component 52 is described below.

The triggering component 52 is connected to the sending component 22, and is configured to trigger the identity request message for acquiring the user identity of the static user terminal to be sent to the static user terminal by at least one of the following triggering manners: triggering the EAP authentication on the static user terminal in a manner of capturing an uplink traffic of an unauthorized static user terminal, wherein the uplink traffic is discovered by matching with a pre-stored static user information table; triggering the EAP authentication on the static user terminal in a manner of capturing a downlink traffic of an unauthorized static user terminal, wherein the downlink traffic is discovered by matching with a pre-stored static user information table; triggering the EAP authentication on the static user terminal in a manner of capturing an ARP message of an unauthorized static user terminal, wherein the ARP message is discovered by matching with a pre-stored static user information table; triggering the EAP authentication on the static user terminal in a manner of capturing an ICMPv6 NS protocol message of an unauthorized static user terminal, wherein the ICMPv6 NS protocol message is discovered by matching with a pre-stored static user information table; triggering the EAP authentication on the static user terminal in a manner of capturing an ARP message of an unauthorized static user terminal, wherein the ARP message is discovered by matching with a pre-stored static user information table; and receiving an EAPoL-start message which is sent by the static user terminal and used for triggering the EAP authentication.

Figure 6:
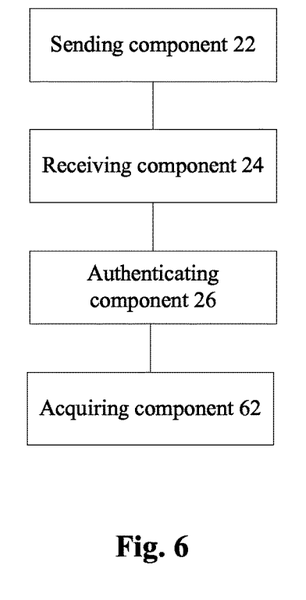
FIG. 6 is an example structural block diagram III of the device for authenticating the static user terminal according to an embodiment of the present disclosure.

FIG. 6 is an example structural block diagram III of the device for authenticating the static user terminal according to an embodiment of the present disclosure, as shown in FIG. 6, the device further comprises an acquiring component 62 besides comprising all the modules in FIG. 2, the acquiring component 62 is described below.

The acquiring component 62 is connected to the authenticating component 26, and is configured to, before or after the EAP authentication is performed on the static user terminal according to the user identity of the static user terminal, acquire identity safety information of the static user terminal by at least one of the following triggering manners: acquiring the identity safety information of the static user terminal in a manner of expanding a configuration option of an EAPoL-Start Announcement configuration; after the EAP authentication is performed successfully, acquiring the identity safety information in a manner of receiving an EAPoL announcement message which is sent by the static user terminal; acquiring the identity safety information by parsing from a matched uplink message in the case where the EAP authentication is triggered by the uplink traffic of the static user terminal; and acquiring the identity safety information by the interaction of an ARP message and/or an NS message.

The preferable embodiment of the present disclosure is described is in combination with the appended drawings of preferred examples below.

The EAPoL, i.e., 802.1X protocol, is mainly applied to the user accessing a wireless LAN (i.e, WLAN) and mainly solves the problem of authentication on the user terminal accessing the WLAN. The uplink traffic or the downlink traffic of an unauthorized static IP user terminal is captured by the gateway according to the configuration, and the user terminal is triggered to be performed an EAP authentication on the gateway equipment, or the unauthorized static IP user takes the initiative to send to the gateway an EAPoL-start message used for the EAP authentication through the 802.1X client, after the authentication, the gateway learns the identity safe information (such as the binding relationship between the user IP and the MAC) of the static IP user terminal in time by a certain mechanism to generate legal user information. The static user terminal access to the network by the 802.1X manner for authentication, so that the security of the static user and the mobility of the wireless user can be greatly improved. Since the EAP protocol born by the 802.1X protocol can provide an authentication platform, a user can use some specific authentication methods such as Extensible Authentication Protocol-Protected Extensible Authentication Protocol (EAP-PEAP), Extensible Authentication Protocol-Subscriber Identity Module (EAP-SIM), Extensible Authentication Protocol-Authentication and Key Agreement (EAP-AKA), Extensible Authentication Protocol-Transport Layer Security (EAP-TLS) and Extensible Authentication Protocol-Tunneled Transport Layer Security (EAP-TTLS) to realize the authentication with a higher security level, not only the disadvantages such as low security in the static user terminal accessing and the poor mobility caused by using a circuit authentication manner are effectively avoided, but also the action that an illegal user embezzles a network and disturbs the network stabilization is prevented to a certain extent.

Figure 7:
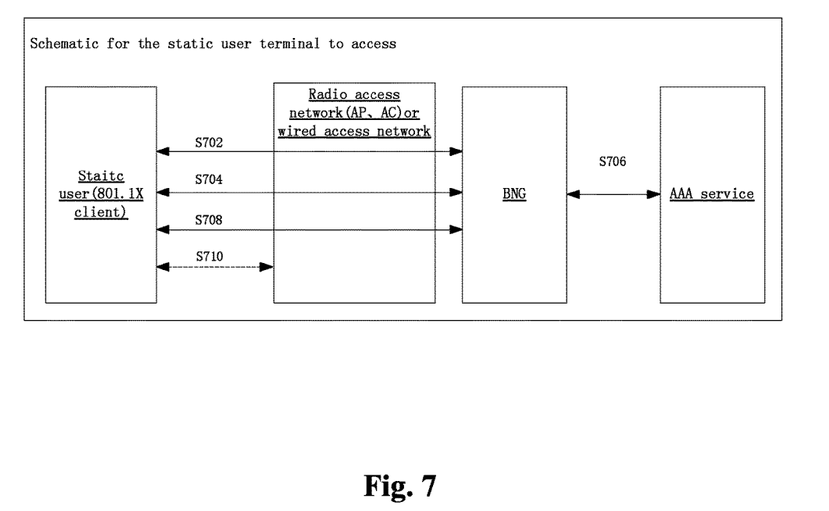
FIG. 7 is a flowchart of a method for authenticating the static IP user accessing the network based on the 802.1X authentication according to an example embodiment of the present disclosure.

A method for authenticating on the static IP user accessing the network based on 802.1X authentication is provided in the present embodiment, FIG. 7 is a flowchart of a method for authenticating the static IP user accessing the network based on the 802.1X authentication according to an example embodiment of the present disclosure, as shown in FIG. 7, an Access Point (AP) and a wireless Access Control (AC) form a WLAN to provide an access network for the user. The flow of the static IP user terminal access to the network based on the 802.1X authentication comprises the following steps:

Step S702, the static user terminal accesses the BNG equipment by a connected network, and the BNG triggers the EAP authentication on the user in a specific manner. The triggering manner comprises, but is not limited to the following three manners:

(1) the static user access a neighbouring CPE (comprising the AP of the WLAN) in an associated way, uses a 802.1X client side to send EAPoL-Start message to the BNG, and the BNG receives the EAPoL-Start message to create an EAPoL user to trigger the EAP authentication;

(2) the uplink traffic of the unauthorized static user terminal is discovered by matching with a static user information table of the BNG, the BNG learns the MAC and the IP of the user, and discovers that a 802.1X access method is required to be used to trigger the EAP authentication;

(3) the downlink traffic on a network side of the unauthorized static user accessing the network is discovered by matching with a user route table of the BNG, the BNG learns the MAC and the IP of the user and the access circuit information according to the static user information table associated with the user route table (the circuit information under this triggering manner is a compulsory configuration), and discovers that a 802.1X access method is required thereby to be used to trigger the EAP authentication.

After the EAP authentication process is ended, the BNG should learn the binding relationship between the MAC address and the IP address of the static user, judge whether the binding relationship between the MAC address and the IP address of the static user is legal according to a local static user information table, and the following four methods can be used but is not limited to:

(1) when the static user terminal uses a 802.1X client side of 802.1X V3 and above version, the options of the EAPoL-Start-Announcement can be extended to announce to the BNG the static IP configured by the static user terminal (STA).

(2) when the static user terminal uses the 802.1X client side of 802.1X V3 and above version, after the authentication on the static user is passed, the EAPoL-Announcement message is sent, wherein the EAPoL-Announcement message carries the expansion options to announce to the BNG the static IP configured by the static user terminal.

(3) In a scenario where the authentication is triggered by the uplink traffic of the user terminal, the IP and the MAC of the static user can be obtained by parsing from a matched message.

(4) The IP and the MAC of the static user is learned by the ARP message or the Neighbour Discovery Protocol (NDP) message interaction.

The method is not limited to be implemented in this step.

After the triggering condition of the EAP authentication is met, the BNG sends the EAPoL-Request-Identity message (i.e., the identity request message) to the static user to request for the identity information which can be that the account number that the BNG allocates especially.

Step S704, the static user processes the EAPoL-EAP-Request-Identity message and sends the EAPoL-EAP-Response-Identity (i.e., the above-mentioned response message) for replying the BNG The static user and the BNG start an EAP authentication session.

Step S706, the BNG packages the EAPoL-EAP-Response-Identity message in an authentication request protocol message (such as an Access-Request message of a Radius), and sends same to the AAA server. The AAA server and the static user negotiate a specific authentication method (such as EAP-PEAP, EAP-TLS, EAP-TTLS, EAP-AKA, EAP-SIM and the like) based on an EAP protocol, and the AAA server interacts with the static user based on this authentication method, so as to complete the authentication to the static user. The AAA server returns the authentication result to the BNG; the BNG sends an EAPoL-EAP-Success message or EAPoL-EAP-Failure message to the static user client side.

The static user terminal receives the EAPoL-EAP-Success message, when the BNG learns the binding relationship of the MAC and the IP of the static user, so far, the user can access the wireless network. When the BNG has not learnt the binding relationship of the MAC and the IP of the static user yet, a step S708 is also needed to complete on-line.

step S708, after the authentication of the static user is performed successfully, the BNG sends an ARP request and/or an NS message of an ICMPv6 to the static user client side, and the static user terminal returns a response. The BNG analyzes the MAC and IP addresses in the response message, whether the static user information such as the MAC and the IP is legal is checked according to the BNG configuration, or the static user terminal reports a static IP configured by the EAPoL-Announcement message. When the BNG detects that the MAC and the IP are matched with the configuration, the static user can access a wireless network so far.

Step S710, the static user accesses the wireless network.

By means of the preferable embodiment, higher safety and reliability are provided for the static user terminal accessing the wireless network, thereby improving the service satisfaction of the static user to use the WLAN service.

The example embodiment of the present disclosure is described respectively according to different application scenarios below.

Figure 8:
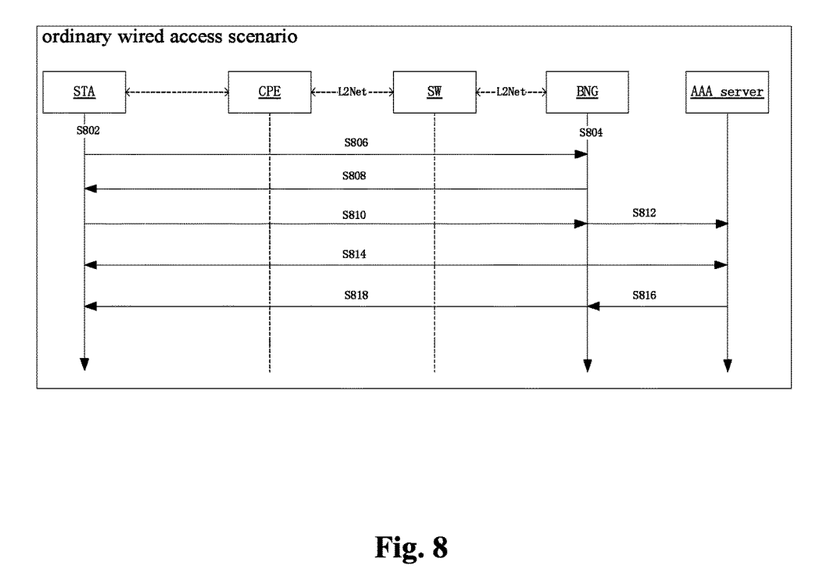
FIG. 8 is an authentication access processing flowchart of a static user terminal accessing the network based on an ordinary wired access scenario according to an example embodiment of the present disclosure.

FIG. 8 is an authentication access processing flowchart of a static user terminal accessing the network based on an ordinary wired access scenario according to an example embodiment of the present disclosure, as shown in FIG. 8, the CPE and a two level switched network are among the BNGs. For the convenience of description, and just as an example, the authentication flow of the static user in the present embodiment is triggered by the uplink traffic or the downlink traffic of the static user. The flow comprises the following steps:

Step S802, information such as static IP address, gateway, DNS are configured on a wireless network card of the static user terminal.

Step S804, static user information is locally configured by a BNG or is configured and delivered by a Network Manage System (NMS) to the BNG, wherein the static user information includes element information such as MAC address, IP address, circuit information, requiring 802.1X access and allowing flow trigger, and these elements are used to judge whether the online static user is legal, wherein "requiring 802.1X access" is a necessary configuration of the present embodiment, and the "circuit information" and the "allowing flow trigger" are optional configuration. After the "circuit information" is configured, the BNG checks whether the access circuit of the static user is matched with the configured circuit information, after the 802.1X authentication is used, the BNG can also be compatible with the circuit authentication for a special user according to the requirements. After the "allowing flow trigger" is configured, the uplink traffic and the downlink traffic of the unauthorized static user are supported to trigger the static user authentication flow.

Step S806, the uplink traffic of the unauthorized static user is discovered by matching with a static user information table of the BNG, the BNG learns the MAC and the IP of the user terminal, and discovers that an 802.1X access method is required to be used, and the BNG starts to create an EAPoL user.

Step S808, the BNG sends an EAPoL-EAP-Request-Identity message to the user to request for identity information.

Step S810, the static user terminal receives the EAPoL-EAP-Request-Identity message, and sends to the BNG the EAPoL-EAP-Response-Identity message carrying the user identity information.

Step S812, the BNG packages the EAPoL-EAP-Response-Identity message in the EAP-Message attribute of the ACCESS-Request message, and sends the ACCESS-Request message to the AAA server.

Step S814, the AAA server and the 802.1X client side of the static user terminal negotiate to use a specific authentication manner EAP-PEAP (or EAP-TLS, EAP-SIM, EAP- AKA, EAP-TTLS and the like) to perform authentication interaction to complete the authentication on the static client.

Step S816, the AAA server sends an ACCESS-Accept/Reject message to the BNG according to an authentication result.

Step S818, the BNG sends the authentication result message (the EAPoL-EAP-Success/EAPoL-EAP-Failure message) to the static user terminal. When an authentication-success message is received, the BNG adds a user host route and a user table and opens a forwarding plane, so that the static user may access the network resource. When the authentication fails, the static user will try the authentication again until a certain number of authentications is exceeded.

So far, the static user can access the network resources.

Figure 9:
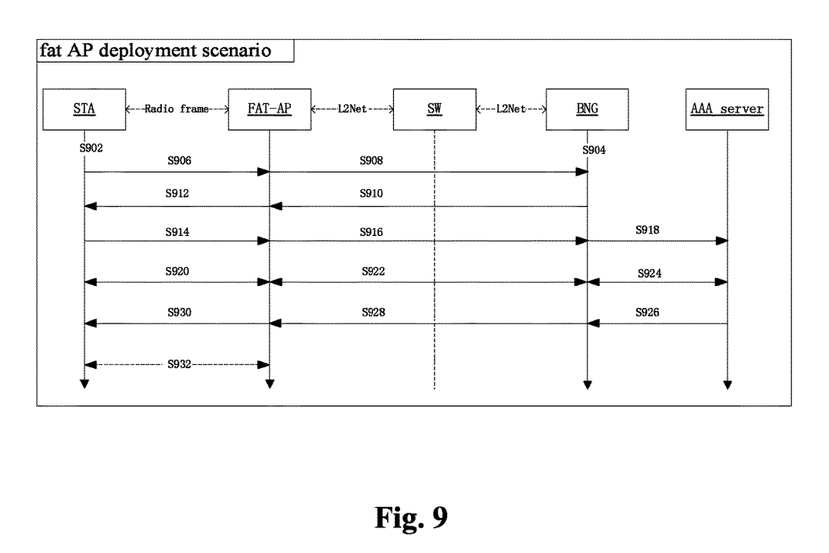
FIG. 9 is an authentication access processing flowchart of a static user terminal accessing the network based on a fat AP deployment scenario according to an example embodiment of the present disclosure.

FIG. 9 is an authentication access processing flowchart of a static user terminal accessing the network based on a fat AP deployment scenario according to an example embodiment of the present disclosure, as shown in FIG. 9, the AP performs local forwarding. The AP is located between the STA and the BNG. For the convenience of description, the static user in the present embodiment uses an 802.1X V3 above version client side to perform 802.1X dialling authentication. The flow comprises the following steps:

Step S902, information such as static IP address, gateway, DNS is configured on a wireless network card of the static user terminal.

Step S904, the BNG server side configures information elements such as MAC, IP address and circuit information of a user, and these elements are used for judging whether an online static user is legal, wherein the circuit information is an optional configuration. After the configuration, the BNG will check whether the access circuit is matched with the configured circuit information. After the 802.1X authentication is used, the BNG can also be compatible with circuit authentication for a special user according to the requirements.

Step S906, the static user terminal associates with the neighbouring access point (AP) by an 802.1X client side, and sends the EAPoL-Start message to the AP. The static user terminal announces an IP address thereof by the EAPoL-Start message.

Step S908, the AP forwards the EAPoL-Start message to the BNG via an access or aggregation switch (SW).

Step S910, the STA is acquired from a TLV option of the EAPoL-Start-Announcement to be announced to the IP address of the BNG, and the BNG completes the validity check to the IP and the MAC of the static user. When the IP and the MAC of the static user are legal, the BNG continues the EAP authentication, starts to create an EAPoL user and sends the EAPoL-EAP-Request-Identity message to the AP to request for identity information.

Step S912, the AP forwards the EAPoL-EAP-Request-Identity message to the static user terminal.

Step S914, the static user terminal responds the EAPoL-EAP-Request-Identity message, and sends to the AP the EAPoL-EAP-Response-Identity message.

Step S916, the AP forwards the EAPoL-Response-Identity message containing user information to the BNG.

Step S918, the BNG packages the EAPoL-EAP-Response-Identity message in the EAP-Message attribute of the ACCESS-Request message, and sends the ACCESS-Request message to the AAA server.

Step S920, the AAA server and the static user terminal negotiate to use a specific authentication method EAP-PEAP (or EAP-TLS, EAP-SIM, EAP-AKA, EAP-TTLS and the like), in flows of step S920, step S922 and step S924, the authentication on the static client side is completed.

Step S926, the AAA server sends an ACCESS-Accept/Reject message to the BNG according to an authentication result.

Step S928, the BNG sends the authentication result (the EAPoL-EAP-Success/EAPoL-EAP-Failure message) to the AP, and when there is a PMK in the AAA authorization information, the BNG tries to bring the PMK to the AP simultaneously. When an authentication-success message is received, the BNG adds a user host route and a user table and opens a forwarding plane, so that the STA may access network resources.

Step S930, the AP forwards the EAPoL-EAP-Success/EAPoL-EAP-Failure authentication message to the static user. When the authentication fails, the static user will try the authentication again until a certain number of authentications is exceeded.

Step S932, when in an air interface ciphering environment, the AP and the 802.1X client side of the static user terminal further negotiate about a key required by the air interface message encryption and decryption.

So far, the static user can access the network resources.

Figure 10:
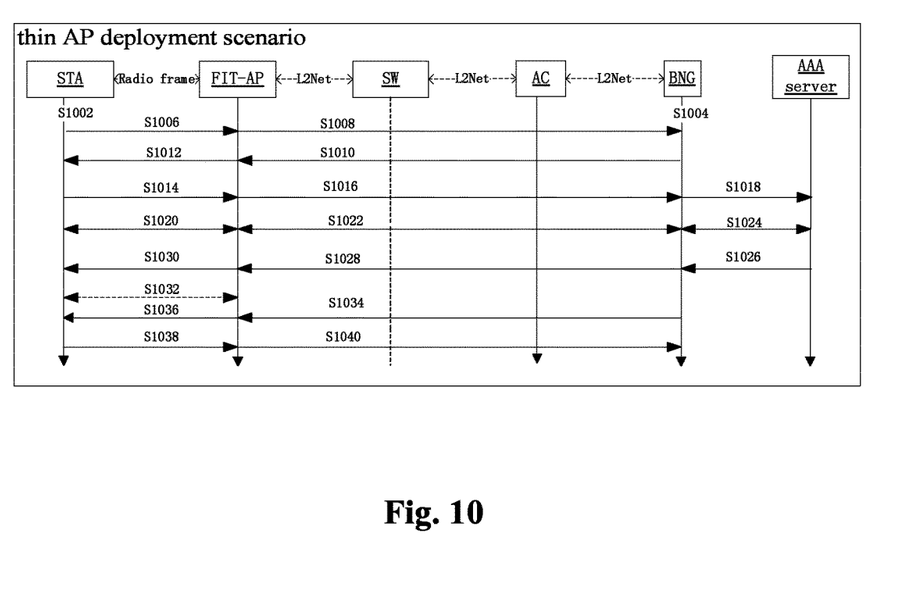
FIG. 10 is an authentication access processing flowchart of a static user terminal accessing the network based on a thin AP deployment scenario according to an example embodiment of the present disclosure.

FIG. 10 is an authentication access processing flowchart of a static user terminal accessing the network based on a thin AP deployment scenario according to a preferred embodiment of the present disclosure, as shown in FIG. 10, the AP performs centralized forwarding. The AC and the AP constitute a radio access network, and the AC performs configuration management and version management on the AP. The message of the static user terminal is forwarded to the BNG via the AP and the AC. The version of an 802.1X dialling client used by a static user terminal in this description example is lower than 802.1X V3 protocol. The flow comprises the following steps:

Step S1002, information such as static IP address, gateway, DNS are configured on a wireless network card of the static user terminal.

Step S1004, a BNG server side configures information elements such as MAC, IP address and circuit information of a user, and the elements are used for judging whether an online static user is legal. After the 802.1X authentication is used, the BNG can also be compatible with the circuit authentication used for a special user as required.

Step S1006, the static user terminal associates with the neighbouring AP by an 802.1X client side, and sends the EAPoL-Start message to the AP.

Step S1008, the AP forwards the EAPoL-Start message to the BNG via the AC.

Step S1010, the BNG starts creating an EAPoL user and sends an EAPoL-EAP-Request-Identity message to the AP through the AC to request for identity information.

Step S1012, the AP forwards the EAPoL-EAP-Request-Identity message to the user terminal.

Step S1014, the static user terminal responds the EAPoL-EAP-Request-Identity message, and sends to the AP the EAPoL-EAP-Response-Identity message.

Step S1016, the AP forwards the EAPoL-EAP-Response-Identity message containing user information to the BNG via the AC.

Step S1018, the BNG takes the EAPoL-EAP-Response-Identity message as the EAP-Message attribute value in the ACCESS-Request message, and sends the ACCESS-Request message to the AAA server.

Step S1020, the AAA server negotiates with the static user terminal to use a specific authentication manner EAP-PEAP (or EAP-TLS, EAP-SIM, EAP-AKA, EAP-TTLS and the like), in flows of step S1020, step S1022 and step S1024, the authentication to the static client is completed.

Step S1026, the AAA server sends an ACCESS-Accept/Reject message to the BNG according to an authentication result.

Step S1028, the BNG sends an authentication result message (the EAPoL-EAP-Success/EAPoL-EAP-Failure message) to the AP through the AC, and the AAA authorization issued PMK is also carried if required.

Step S1030, the AP forwards the authentication result message of the EAPoL to the static user terminal.

Step S1032, when in an air interface ciphering environment, the AP and the 802.1X client side of the static user terminal further negotiate about a key required by the air interface message encryption and decryption. The AC is allowed to but not recommended replace the AP to negotiate a key of an air interface.

Step S1034, the BNG receives an AAA-authentication-success message and sends an ARP request message to the AP through the AC.

Step S1036, the AP forwards the ARP request message to an STA static user terminal.

Step S1038, the static user terminal sends an ARP response to the AP.

Step S1040, the AP forwards the ARP response to the BNG, the BNG judges the legality of the IP and the MAC of the static user according to the IP and the MAC in the ARP response, when the detection is passed, the BNG adds a user host route and a user table and opens a forwarding plane, so that the STA and authorized external network resources are communicated.

So far, the static user can access the network resources.

Figure 11:
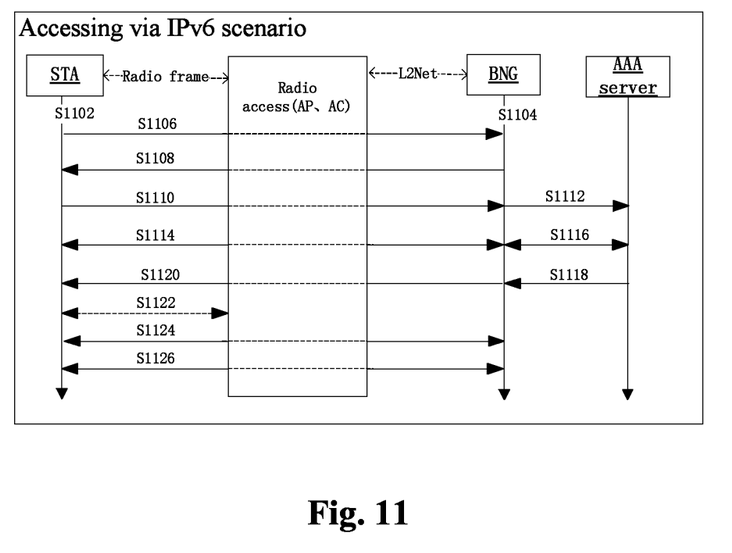
FIG. 11 is an authentication access processing flowchart of a static user terminal accessing a network by an IPV6 based on 802.1X authentication according to an example embodiment of the present disclosure.

In the present embodiment, the solution that the static user supporting the 802.1X authentication accesses by IPV6 is derived based on a general access scenario and a fat AP deployment scenario, FIG. 11 is an authentication access processing flowchart of a static user terminal accessing a network by an IPV6 based on 802.1X authentication according to an example embodiment of the present disclosure, as shown in FIG. 11, the wireless network is networked by the AP and the AC to complete the centralized forwarding, and the local forwarding also can be completed by the FAT-AP. The flow comprises the following steps:

Step S1102, information such as IPV6 address, gateway, DNS are configured on a wireless network card of the static user terminal.

Step S1104, a BNG server side configures information elements such as MAC, IPV6 and circuit information of the user terminal and the elements are used for judging whether an online static user is legal.

Step S1106, the static user terminal is associated with the neighbouring AP, sends the EAPoL-Start message, and forwards same to the BNG through the WLAN network.

Step S1108, the BNG creates an EAPoL user, and sends an EAPoL-EAP-Request-Identity message to the user terminal through the WLAN network to request for identity information.

Step S1110, the static user terminal responds the EAPoL-EAP-Request-Identity message, and sends to the BNG the EAPoL-EAP-Response-Identity message through the WLAN network.

Step S1112, the BNG takes the EAPoL-EAP-Response-Identity message as an EAP-Message attribute value of the ACCESS-Request message of an RADIUS protocol, and sends the ACCESS-Request message to the AAA server.

Step S1114, the AAA server and the static user terminal negotiate a specific authentication manner EAP-PEAP (or EAP-TLS, EAP-TTLS and the like); in flows of step S1114 and step S1116, the authentication on the static client is completed.

Step S1118, the AAA server sends an ACCESS-Accept/Reject message to the BNG according to an authentication result.

Step S1120, the BNG sends the EAPoL-EAP-Success/EAPoL-EAP-Failure message to the static user terminal.

Step S1122, when in an air interface ciphering environment, the AP and the 802.1X client side of the static user terminal further negotiate about a key required by the air interface message encryption and decryption. The transmission of the PMK refers to the embodiment described before.

Step S1124, when the authentication succeeds, the static user terminal sends an NS message to the BNG, the BNG detects whether the IP address and the MAC are legal according to the configuration, when the detection is passed, the BNG opens the forwarding plane to complete the IPv6 message forwarding.

Step S1126, the user terminal sends an RS request to the BNG, and the BNG responses an RS message. The BNG sends the RA message containing a prefix to the user terminal, and announces to the user terminal a default route.

So far, the static user can access the network resources.

In a V6 address scenario, the BNG also acquires an IPV6 address by a TLV filed of the EAPoL-Start/EAPoL-Start-Announce, also can acquire the IPV6 address of the static user terminal from the NS message to perform legality detection on the IPV6 address and the MAC address.

Obviously, those skilled in the art should know that each of the mentioned components or steps of the present disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the present disclosure is not restricted to any particular hardware and software combination.

The descriptions above are only the preferable embodiment of the present disclosure, which are not used to restrict the present disclosure, for those skilled in the art; the present disclosure may have various changes and variations. Any amendments, equivalent substitutions, improvements, etc. within the principle of the present disclosure are all included in the scope of the protection of the present disclosure.

The invention claimed is:

1. A method for authenticating a static user terminal, characterized by comprising:

sending to the static user terminal an identity request message used for acquiring a user identity of the static user terminal;

receiving a response message from the static user terminal, wherein the response message carries the user identity of the static user terminal;

performing an Extensible Authentication Protocol, EAP, authentication on the static user terminal according to the user identity of the static user terminal;

wherein the identity request message used for acquiring the user identity of the static user terminal is triggered to be sent to the static user terminal by at least one of the following triggering manners:

triggering the EAP authentication on the static user terminal in a manner of capturing an uplink traffic of an unauthorized static user terminal, wherein the uplink traffic is discovered by matching with a pre-stored static user information table;

triggering the EAP authentication on the static user terminal in a manner of capturing a downlink traffic of an unauthorized static user terminal, wherein the downlink traffic is discovered by matching with a pre-stored static user information table;

triggering the EAP authentication on the static user terminal in a manner of capturing an Address Resolution Protocol, ARP, message of an unauthorized static user terminal, wherein the ARP message is discovered by matching with a pre-stored static user information table;

triggering the EAP authentication on the static user terminal in a manner of capturing an Internet Control Message Protocol Version 6 Neighbour Solicitation, ICMPv6 NS, protocol message of an unauthorized static user terminal, wherein the ICMPv6 NS protocol message is discovered by matching with a pre-stored static user information table;

triggering the EAP authentication on the static user terminal in a manner of capturing an ARP message of an unauthorized static user terminal, wherein the ARP message is discovered by matching with a pre-stored static user information table;

receiving an EAPoL-start message which is sent by the static user terminal and used for triggering the EAP authentication.

2. The method according to claim 1, characterized in that after the EAP authentication is performed on the static user terminal according to the user identity of the static user terminal, and in a case where the EAP authentication is performed successfully, the method further comprises:

transmitting to an access key agreement point a pair-wise master key carried in authorization information, wherein the access key agreement point negotiates, with a 802.1X client side of the static user terminal, a key used for air interface data message interaction.

3. The method according to claim 1, characterized in that performing, according to the user identity of the static user terminal, the EAP authentication on the static user terminal accessing a network based on an Extensible Authentication Protocol over Local Area Network, EAPoL, comprises:

transmitting an access request message to an Authentication, Authorization and Accounting, AAA, server, wherein the access request message carries the user identity of the static user terminal which requests to access the network based on the EAPoL;

receiving an authentication result from the AAA server, wherein the AAA server performs, according to the user identity of the static user terminal, a negotiation and an authentication on the static user terminal accessing the network based on the EAPoL.

4. The method according to claim 1, characterized in that before or after the EAP authentication is performed on the static user terminal according to the user identity of the static user terminal, the method further comprises: acquiring identity safety information of the static user terminal by at least one of the following triggering manners:

acquiring the identity safety information of the static user terminal in a manner of expanding a configuration option of an EAPoL-Start Announcement configuration;

after the EAP authentication is performed successfully, acquiring the identity safety information of the static user terminal in a manner of receiving an EAPoL announcement message which is sent by the static user terminal;

acquiring the identity safety information of the static user terminal by parsing from a matched uplink message in a case where the EAP authentication is triggered by an uplink traffic of the static user terminal;

acquiring the identity safety information of the static user terminal by interaction of an ARP message and/or an NS message.

5. A device for authenticating a static user terminal, characterized by comprising: a hardware processor, configured to perform programming elements stored in a memory, wherein the programming elements comprise: a sending component, connected to a receiving component and configured to send to the static user terminal an identity request message used for acquiring a user identity of the static user terminal;

the receiving component, connected to the sending component and configured to receive a response message from the static user terminal, wherein the response message carries the user identity of the static user terminal;

an authenticating component, connected to the receiving component and configured to perform an Extensible Authentication Protocol, EAP, authentication on the static user terminal according to the user identity of the static user terminal;

wherein the programming elements further comprises a triggering component, configured to trigger the identity request message used for acquiring the user identity of the static user terminal to be sent to the static user terminal by at least one of the following triggering manners:

triggering the EAP authentication on the static user terminal in a manner of capturing an uplink traffic of an unauthorized static user terminal, wherein the uplink traffic is discovered by matching with a pre-stored static user information table;

triggering the EAP authentication on the static user terminal in a manner of capturing a downlink traffic of an unauthorized static user terminal, wherein the downlink traffic is discovered by matching with a pre-stored static user information table;

triggering the EAP authentication on the static user terminal in a manner of capturing an Address Resolution Protocol, ARP, message of an unauthorized static user terminal, wherein the ARP message is discovered by matching with a pre-stored static user information table;

triggering the EAP authentication on the static user terminal in a manner of capturing an Internet Control Message Protocol Version 6 Neighbour Solicitation, ICMPv6 NS, protocol message of an unauthorized static user terminal, wherein the ICMPv6 NS protocol message is discovered by matching with a pre-stored static user information table;

triggering the EAP authentication on the static user terminal in a manner of capturing an ARP message of an unauthorized static user terminal, wherein the ARP message is discovered by matching with a pre-stored static user information table;

receiving an EAPoL-start message which is sent by the static user terminal and used for triggering the EAP authentication.

6. The device according to claim 5, characterized in that the programming elements further comprises:

a transmitting component, configured to, after the EAP authentication is performed on the static user terminal according to the user identity of the static user terminal and in a case where the EAP authentication is performed successfully, transmit to an access key agreement point a pair-wise master key carried in authorization information, wherein the access key agreement point negotiates, with a 802.1X client side of the static user terminal, a key used for air interface data message interaction.

7. The device according to claim 5, characterized in that the authenticating component comprises:

a transmitting element, configured to transmit an access request message to an Authentication, Authorization and Accounting, AAA, server, wherein the access request message carries the user identity of the static user terminal, which requests to access a network based on an Extensible Authentication Protocol over Local Area Network, EAPoL;

a receiving element, configured to receive an authentication result from the AAA server, wherein the AAA server performs, according to the user identity of the static user terminal, a negotiation and an authentication on the static user terminal accessing the network based on the EAPoL.

8. The device according to claim 5, characterized in that the programming elements further comprises an acquiring component, configured to, before or after the EAP authentication is performed on the static user terminal according to the user identity of the static user terminal, acquire identity safety information of the static user terminal by at least one of the following triggering manners:

acquiring the identity safety information of the static user terminal in a manner of expanding a configuration option of an EAPoL-Start Announcement configuration;

after the EAP authentication is performed successfully, acquiring the identity safety information in a manner of receiving an EAPoL announcement message which is sent by the static user terminal;

acquiring the identity safety information by parsing from a matched uplink message in a case where the EAP authentication is triggered by an uplink traffic of the static user terminal;

acquiring the identity safety information by the interaction of an ARP message and/or an NS message.

\* \* \* \* \*